US012798686B2

(12) United States Patent
Hilfer et al.

(10) Patent No.: US 12,798,686 B2
(45) Date of Patent: Nov. 17, 2026

(54) MAINTENANCE LID FOR A VEHICLE SEAT ASSEMBLY

(71) Applicant: Honda Motor Co., Ltd., Tokyo (JP)

(72) Inventors: Derek Hilfer, Columbus, OH (US); Michael V Peterson, Marysville, OH (US); Takeshi Kamiyama, Dublin, OH (US); Pavan Guttikonda, Dublin, OH (US); Gautham Govindarajan, Dublin, OH (US); Saurabh Borse, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 258 days.

(21) Appl. No.: 18/949,705

(22) Filed: Nov. 15, 2024

(65) Prior Publication Data

US 2026/0138679 A1 May 21, 2026

(51) Int. Cl.

| | |
|---|---|
| ***B62D 25/24*** | (2006.01) |
| ***B60N 2/68*** | (2006.01) |
| ***B60R 7/04*** | (2006.01) |
| ***B62D 25/08*** | (2006.01) |

(52) U.S. Cl.

CPC ............... *B62D 25/24* (2013.01); *B60N 2/68* (2013.01); *B60R 7/043* (2013.01); *B62D 25/082* (2013.01)

(58) Field of Classification Search

CPC ........ B62D 25/24; B62D 25/082; B60R 7/043

See application file for complete search history.

(56) References Cited

U.S. PATENT DOCUMENTS 5,064,016 A 11/1991 Iwai et al.
5,957,521 A * 9/1999 Schlachter .............. B60R 7/043 297/188.09
6,106,044 A * 8/2000 Schlachter .............. B60R 7/043 297/188.09
6,824,029 B2 * 11/2004 Tuel, Jr. .................. F41C 33/06 297/188.09
7,232,171 B2 6/2007 Lan et al.
7,517,014 B2 4/2009 Schroeder et al.
7,984,781 B2 * 7/2011 Nozaki .................. B62D 25/20 180/908
9,487,149 B2 * 11/2016 Shimada ................. B60R 7/043
9,650,078 B2 * 5/2017 Kinsman .................. B60G 3/20

(Continued)

FOREIGN PATENT DOCUMENTS

DE 4125416 C2 11/1994

*Primary Examiner* — Jeffrey J Restifo

(74) *Attorney, Agent, or Firm* — Joshua Freier; American Honda Motor Co., Inc.

(57) ABSTRACT

A maintenance lid for a vehicle seat assembly is disclosed. The vehicle seat assembly includes a seat frame, a seat bottom, and a body panel attached to the seat frame and arranged underneath the seat bottom, and defines an opening and a tool kit chamber. The maintenance lid includes a lid structure arranged underneath the seat bottom and engaged to the body panel. The lid structure includes a storage box having a receptacle with an upper end of the receptacle defining an upper opening. The receptacle extends inside a hollow interior of the seat frame through the opening. A skirt portion extends along the upper end of the receptacle and outwardly of the receptacle. Moreover, the lid structure includes a lid portion integral to the storage box and extending from the first end to the storage box to cover the tool kit chamber.

20 Claims, 11 Drawing Sheets

(56) References Cited

U.S. PATENT DOCUMENTS

| | | | | |
|---|---|---|---|---|
| 9,764,767 | B2 * | 9/2017 | Proulx | B60N 2/3045 |
| 9,776,573 | B2 * | 10/2017 | Wiley | B60R 7/043 |
| 9,889,777 | B2 * | 2/2018 | Proulx | B60N 2/38 |
| 10,086,766 | B2 * | 10/2018 | Osterhoff | B60N 2/68 |
| 10,160,392 | B2 * | 12/2018 | Line | B60N 2/206 |
| 10,336,262 | B2 * | 7/2019 | Mozurkewich | B60N 2/42763 |
| 10,406,986 | B2 * | 9/2019 | Roy | B60R 7/043 |
| 10,479,290 | B2 * | 11/2019 | Simard | B60R 11/06 |
| 10,710,659 | B2 * | 7/2020 | Kobayashi | B62J 7/06 |
| 10,800,338 | B2 * | 10/2020 | Roy | B60R 7/043 |
| 11,173,959 | B2 | 11/2021 | Chalifour | |
| 11,325,537 | B2 * | 5/2022 | Hernandez Soto | B60R 7/043 |
| 11,560,071 | B2 * | 1/2023 | Constien | B60N 2/3056 |
| 11,772,565 | B2 * | 10/2023 | Zaremba | A45C 3/00<br>296/37.15 |
| 11,951,839 | B2 | 4/2024 | Wang et al. | |
| 12,179,706 | B2 * | 12/2024 | Meyer | B60N 2/22 |
| 2014/0225403 | A1 * | 8/2014 | Shimada | B60N 2/06<br>297/188.1 |
| 2017/0217375 | A1 * | 8/2017 | Wiley | B60N 2/686 |
| 2018/0265010 | A1 * | 9/2018 | Line | B60N 2/22 |
| 2022/0340085 | A1 * | 10/2022 | Li | B60R 7/043 |
| 2023/0365215 | A1 | 11/2023 | Purcell et al. | |
| 2026/0034922 | A1 * | 2/2026 | Line | B60N 2/3047 |
| 2026/0138679 | A1 * | 5/2026 | Hilfer | B60N 2/68 |

* cited by examiner

MAINTENANCE LID FOR A VEHICLE SEAT ASSEMBLY

BACKGROUND

The disclosed subject matter relates generally to vehicles. More particularly, the disclosed subject matter relates to a maintenance lid for a vehicle seat assembly.

Vehicles have removable covers i.e., access panels arranged under the seat cushions to reach engine compartment to enable maintenance. Some covers may be removable without additional tools. However, the removable covers have poor sealing, and causes heat and noise from the engine to reach the passenger seating on the seat cushion, which is undesirable. Also, some of the covers that provide good sealing includes multiple components and special tools are need to remove such covers to access the engine compartment, which is time consuming and cumbersome.

SUMMARY

In accordance with one embodiment of the present disclosure, a maintenance lid for a vehicle and adapted to be used with a vehicle seat assembly is disclosed. The vehicle seat assembly includes a seat frame, a seat bottom configured to support a passenger, and a body panel attached to the seat frame and arranged, at least partially, underneath the seat bottom. The body panel defines an opening and a tool kit chamber arranged beneath the seat bottom. The maintenance lid includes a lid structure having a first end and a second end. The lid structure is configured to be arranged underneath the seat bottom and engaged to the body panel. The lid structure includes a storage box having receptacle with an upper end of the receptacle defining an upper opening. The receptacle is adapted to extend inside a hollow interior of the seat frame through the opening. The storage box further includes a skirt portion extending, partially, along, the upper end of the receptacle and outwardly of the receptacle. The skirt portion is adapted to engage with the body panel. Moreover, the lid structure includes a lid portion integral to the storage box and extending from the first end to the storage box. The lid portion is configured to cover the tool kit chamber and adapted to engage with the body panel.

In accordance with another embodiment of the present disclosure, a vehicle seat assembly is provided. The vehicle seat assembly includes a seat frame, and a seat bottom supported on the seat frame and configured to support a passenger. The vehicle seat assembly also includes a body panel attached to the seat frame and arranged, at least partially, underneath the seat bottom. The body panel defines an opening and a tool kit chamber arranged beneath the seat bottom. Further, the vehicle seat assembly includes a maintenance lid removably engaged to the body panel. The maintenance lid includes a lid structure having a first end and a second end. The lid structure extends underneath the seat bottom and is engaged to the body panel. The lid structure includes a storage box having a receptacle with an upper end of the receptacle defining an upper opening. The receptacle is adapted to extend inside a hollow interior of the seat frame through the opening. The storage box also includes a skirt portion extending, partially, along, the upper end of the receptacle and outwardly of the receptacle. The skirt portion is arranged engaged with the body panel. Moreover, the lid structure includes a lid portion integral to the storage box and extending from the first end to the storage box, covering the tool kit chamber and engaged with the body panel.

In accordance with yet a further embodiment of the present disclosure a vehicle is disclosed. The vehicle includes a body to support one or components of the vehicle and defining an engine compartment, and a seat frame arranged supported on the body. The engine compartment is arranged beneath the seat frame. Further, the vehicle includes a seat bottom supported on the seat frame and configured to support a passenger, and a body panel attached to the seat frame and arranged, at least partially, underneath the seat bottom. The body panel defines an opening of the engine compartment and a tool kit chamber arranged beneath the seat bottom. The vehicle further includes a maintenance lid removably engaged to the body panel and having a lid structure with a first end and a second end. The lid structure extends underneath the seat bottom and is engaged to the body panel. The lid structure includes a storage box having a receptacle with an upper end of the receptacle defining an upper opening. The receptacle is adapted to extend inside a hollow interior of the seat frame through the opening. The storage box further includes a skirt portion extending, partially, along, the upper end of the receptacle and outwardly of the receptacle. The skirt portion is arranged engaged with the body panel. Moreover, the lid structure includes a lid portion integral to the storage box and extending from the first end to the storage box, covering the tool kit chamber and engaged with the body panel.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-11, wherein like numbers indicate the same or corresponding elements throughout the views.

Figure 1:
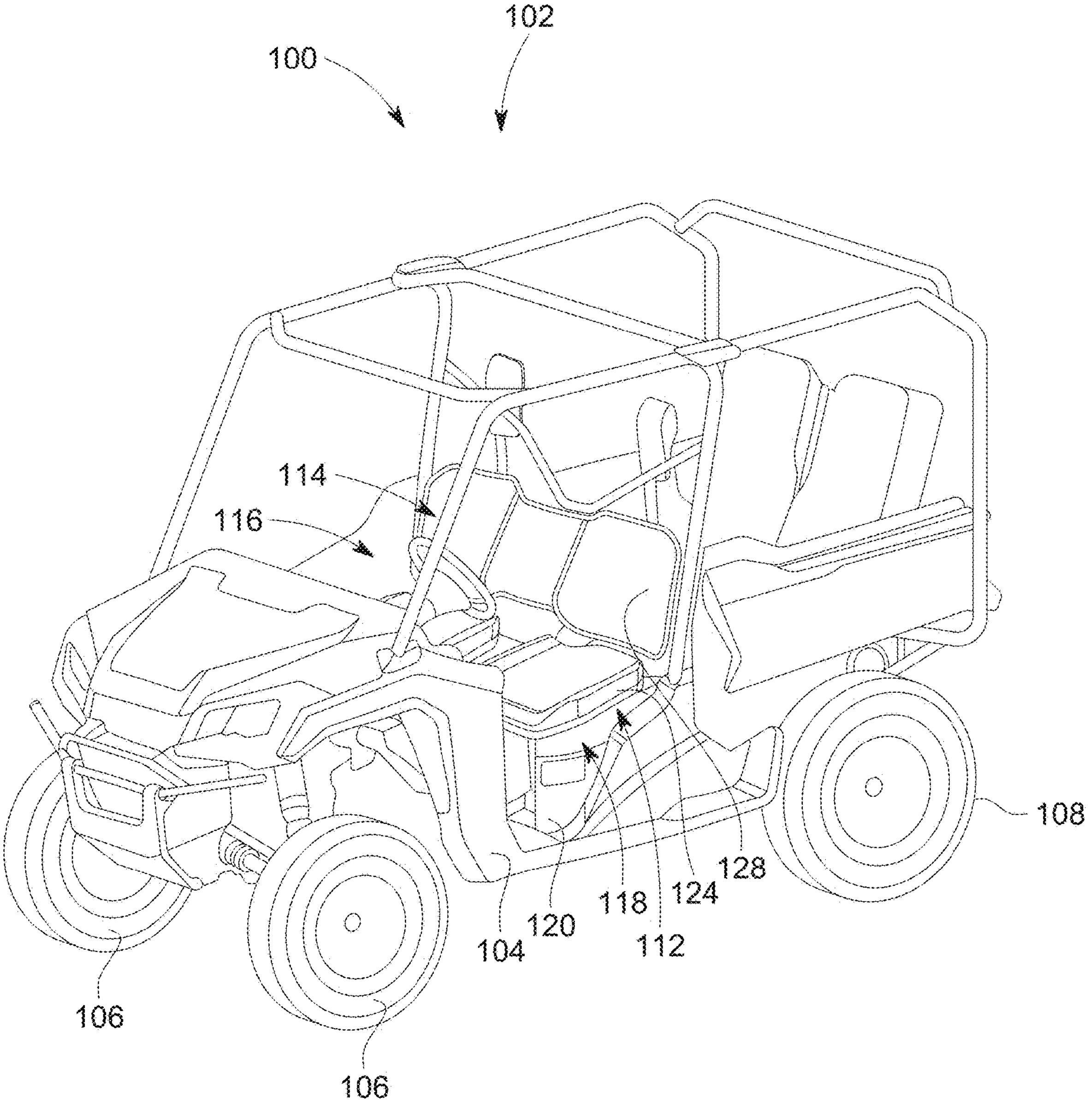
FIG. 1 is a front perspective view of a vehicle, in accordance with one embodiment of the present disclosure.
Figure 2:
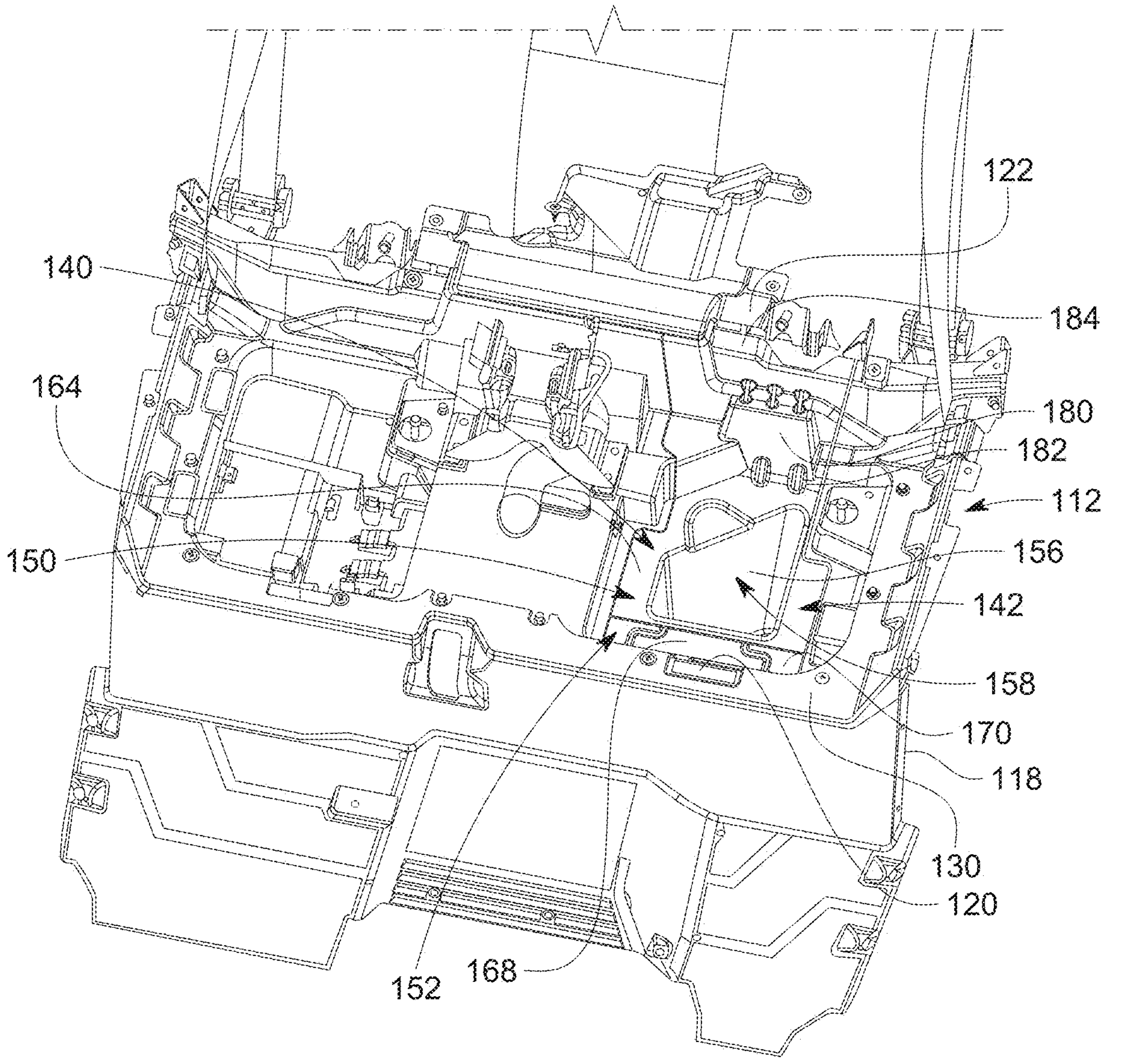
FIG. 2 is a top perspective view of vehicle seat assemblies of the vehicle with seat bottom or cushions removed and a depicting a maintenance lid, in accordance with one embodiment of the present disclosure.
Figure 3:
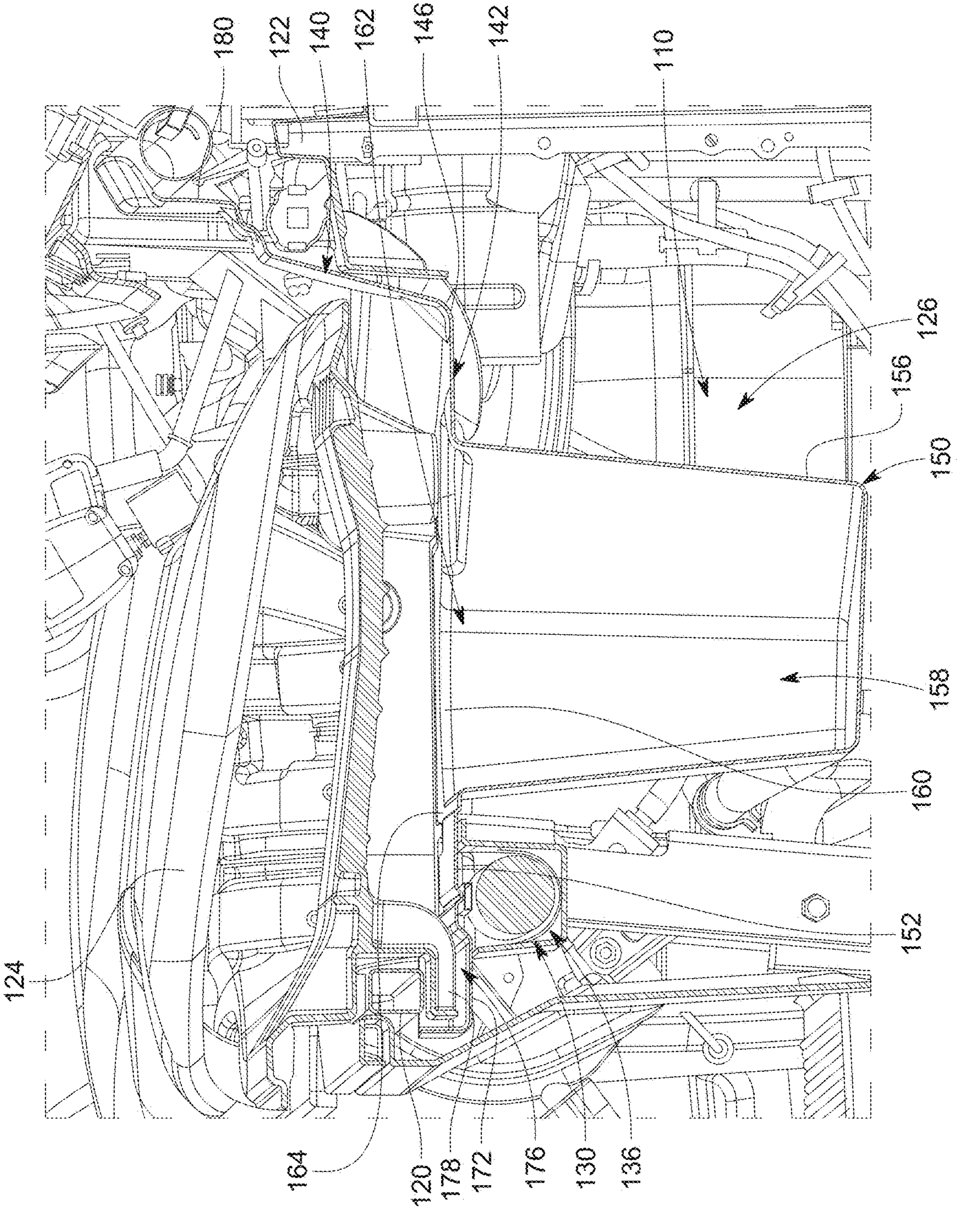
FIG. 3 is a side sectional perspective view of the vehicle seat assembly, in accordance with one embodiment of the present disclosure.
Figure 4:
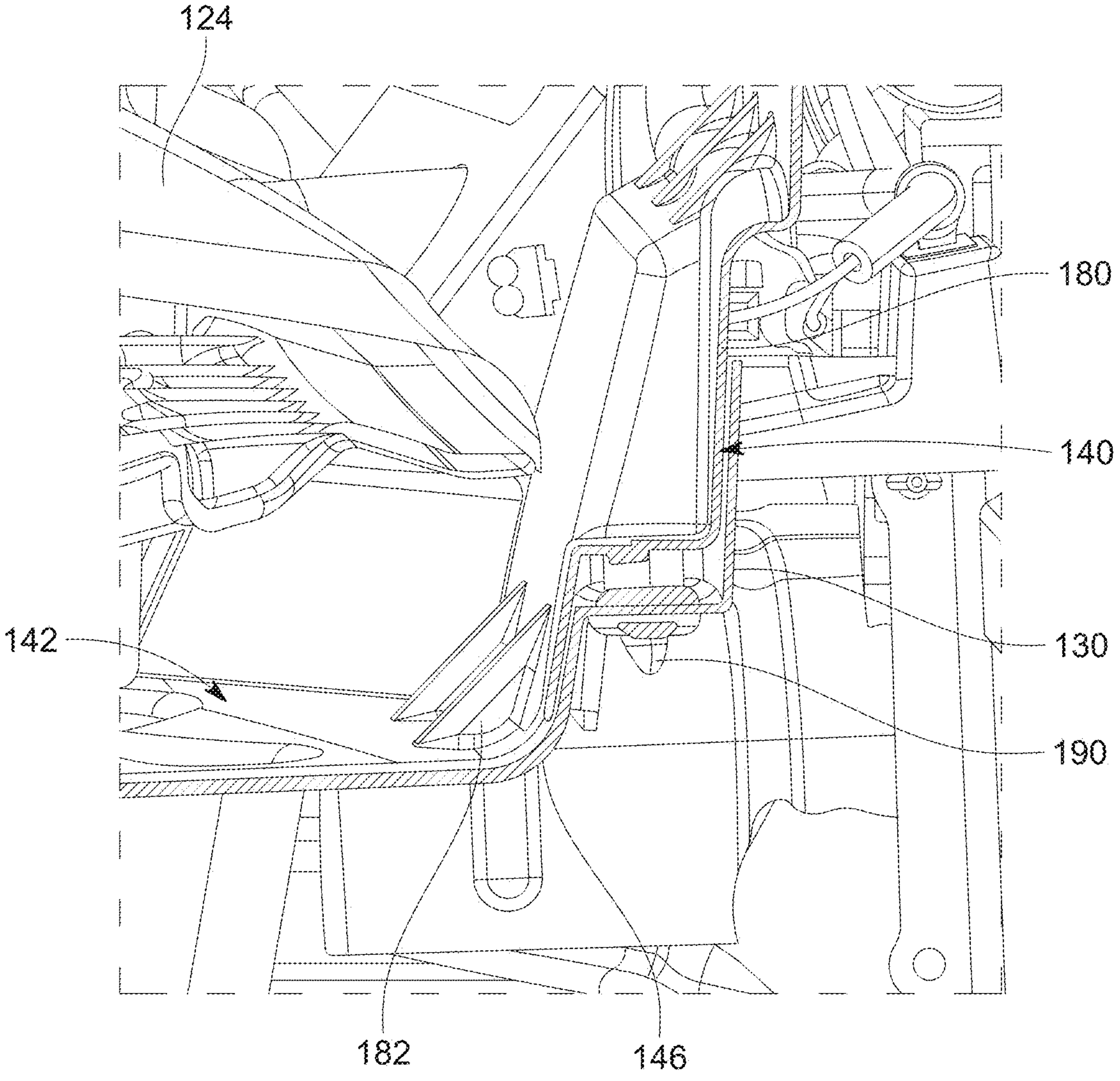
FIG. 4 depicts a sectional view of a portion of the vehicle seat assembly depicting a grommet of the maintenance lid engaged with a body panel, in accordance with one embodiment of the present disclosure.
Figure 5:
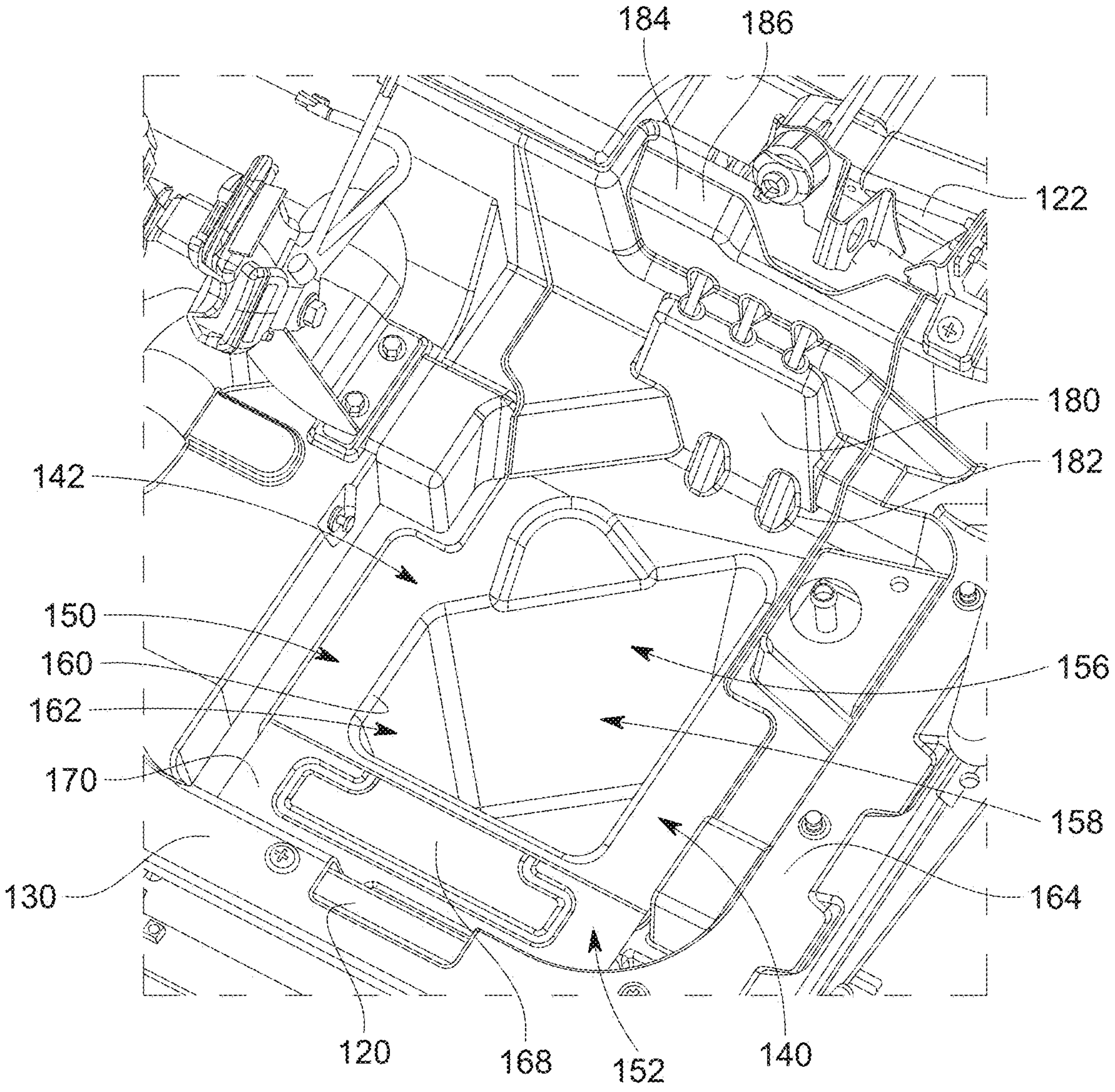
FIG. 5 depicts a top perspective view of a portion of the vehicle seat assembly depicting the maintenance lid arranged on a body panel, in accordance with one embodiment of the present disclosure.
Figure 6:
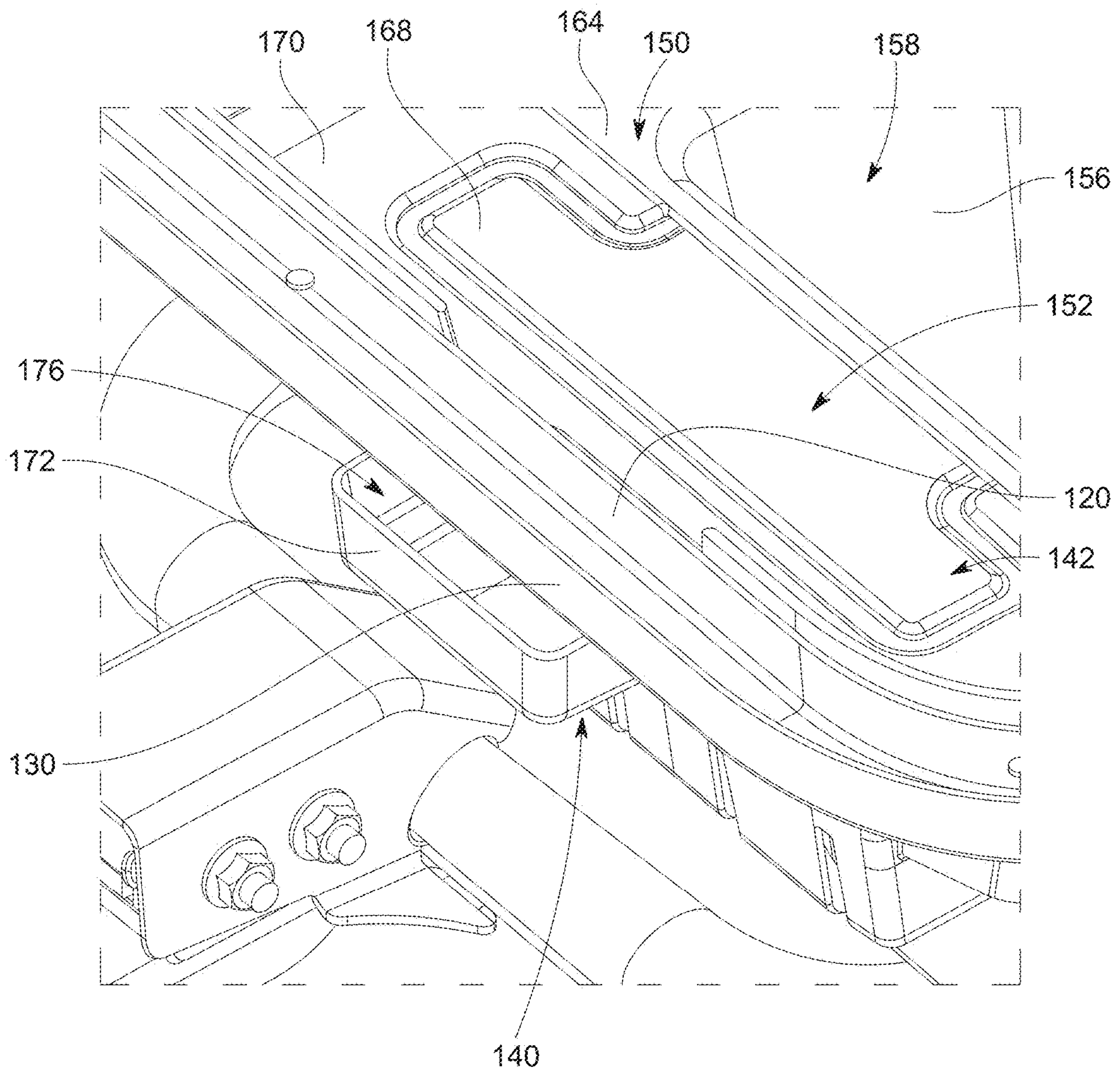
FIG. 6 depicts a top front perspective view of a front portion of the vehicle seat assembly depicting a cup structure of the maintenance lid arranged underneath the seat frame, in accordance with one embodiment of the present disclosure.
Figure 7:
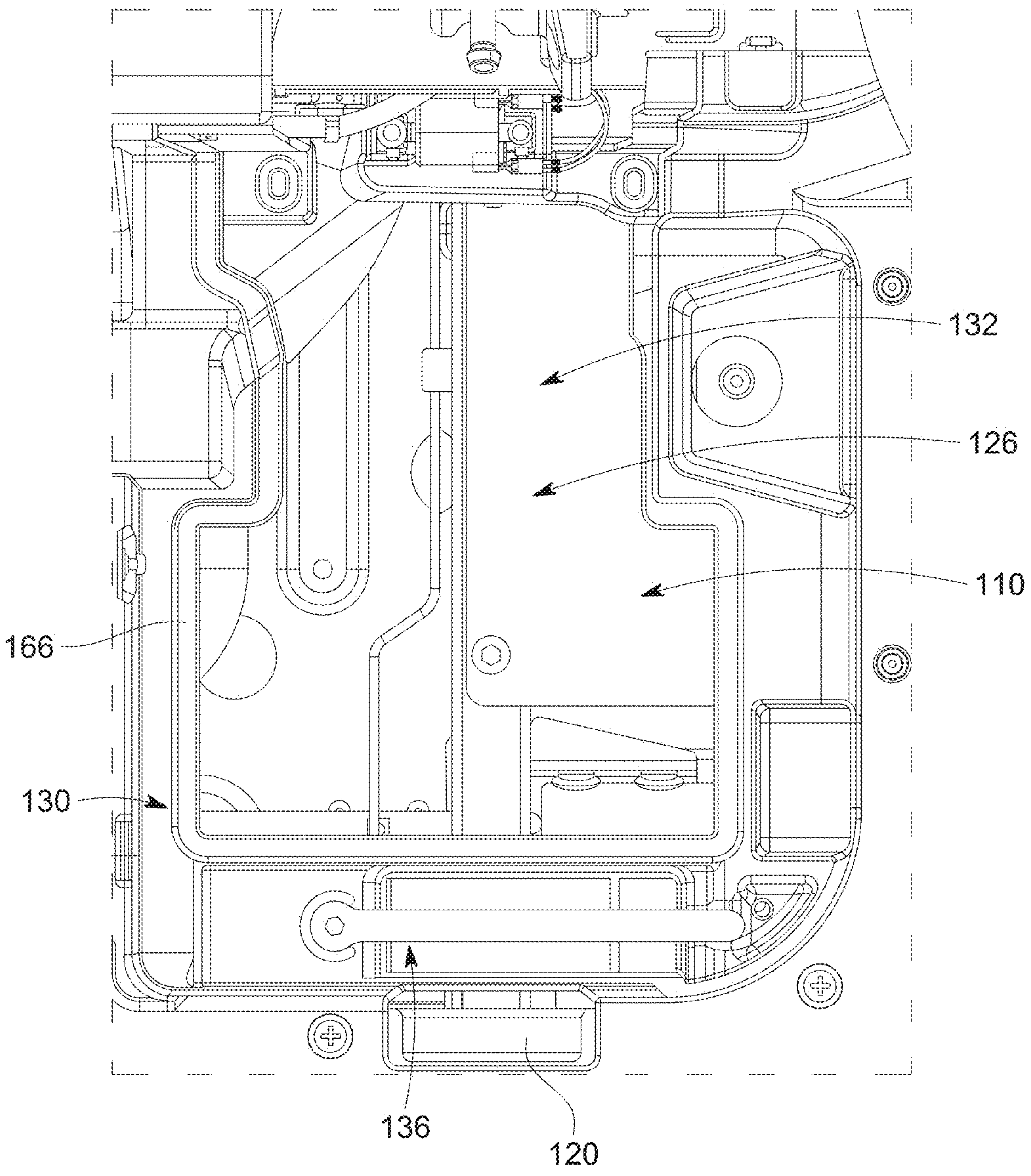
FIG. 7 illustrates a top perspective view of the vehicle seat assembly with the seat bottom and the maintenance lid removed depicting an under-body cavity of the seat frame and an engine compartment of the vehicle, in accordance with one embodiment of the present disclosure.
Figure 8:
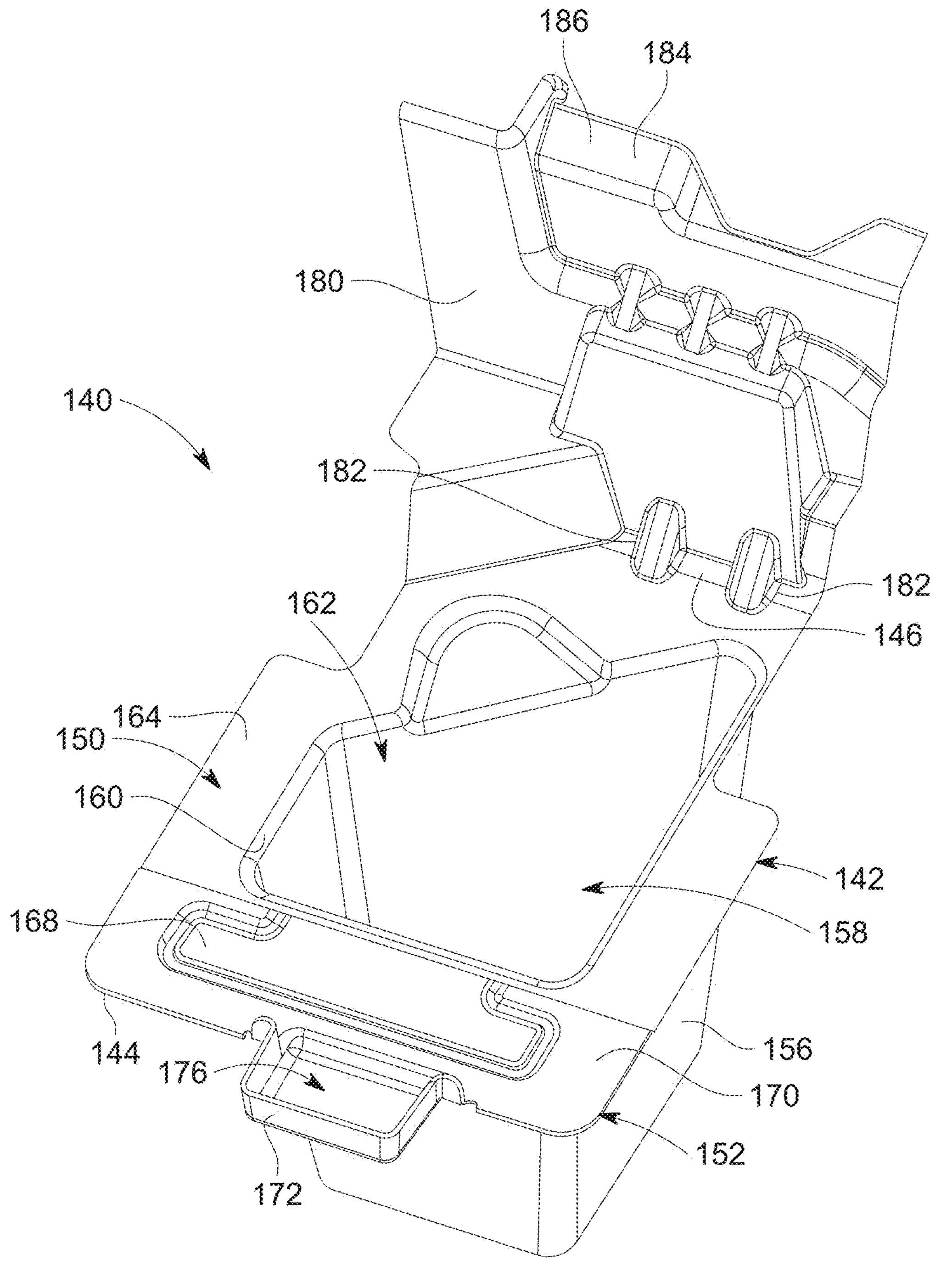
FIG. 8 illustrates a top perspective view of the maintenance lid, in accordance with one embodiment of the present disclosure.

FIG. 1 illustrates a perspective view of a vehicle, indicated generally at 100, in accordance with one embodiment of the present disclosure. The vehicle 100 is shown as a multi-utility vehicle 102, however, the vehicles 100 in accordance with alternative embodiments can comprise any variety of vehicles, including a side-by-side all-terrain vehicle, for example, or any other vehicle adapted to move on an unimproved path or on an unmarked path. For example, embodiments are intended to include or otherwise cover any type of automobile, including a passenger car, minivan, truck, other types of all-terrain vehicle (ATV), semi-tractor, off-highway vehicle, etc. The vehicle 100 includes a body 104, a plurality of wheels including a pair of front wheels 106 and a pair of rear wheels 108 supporting the body 104 on s surface, and a powertrain to power the plurality of wheels 106, 108. The powertrain is omitted from FIG. 1 for simplicity and clarity of the drawing. The body 104 defines an engine compartment 110, shown in FIGS. 3 and 7, inside which a power source, for example, an engine is arranged. Further, the body 104 provide support to various other components of the vehicle. For example, the vehicle 100 includes at least one seat assembly, for example, a pair of vehicle seat assemblies, for example, a first vehicle seat assembly 112 and a second vehicle seat assembly 114, arranged supported on the body 104 and arranged inside a passenger area 116 of the vehicle 100 to enable a seating of a pair of passengers, including a driver of the vehicle 100.

As shown in FIG. 1, the first vehicle seat assembly 112, hereinafter simply referred to as seat assembly, includes a frame 118 mounted to the body 104 and having a seat frame 120 arranged substantially horizontally and a back frame 122 extending vertically from the seat frame 120. A seat bottom 124 i.e., cushion 124, is arranged supported on the seat frame 120. The seat frame 120 is configured as a frame defining an under-seat cavity 126, best shown in FIGS. 3 and 7, of the engine compartment 110. The under-seat cavity 126 is a space defined by surrounding portions of the seat frame 120 and is disposed substantially underneath the seat bottom 124. The seat frame 120 includes an upper portion that approximately aligns with edge portions of the seat bottom 124, or may be alternatively configured.

The seat bottom 124 is disposed on a top side of the seat frame 120 within the passenger area 116. In some embodiments, the seat bottom 124 may be hingedly/pivotably attached along an edge of the seat frame 120 so as to form a lid capable of being rotated between opened and closed positions. In embodiments, the seat bottom 124 is hingedly/pivotably attached to a rear end of the seat frame 120. In some embodiments, the seat bottom 124 may be removably attached to the seat frame 120 and is arranged to be removed from the seat frame 120 to provide an access of the under-seat cavity 126 or any other structure arranged underneath the seat bottom 124. The seat bottom 124 may be formed of plastic, rubber, foam, or any other appropriate material for providing seating support for a passenger. Further, the seat assembly 112 includes a back rest 128 arranged vertically to the seat bottom 124 and along the back frame 122 to support a back of the passenger seated on the seat bottom 124.

Moreover, referring to FIGS. 2 to 5, and 7, the seat assembly 112 includes a body panel 130 attached to the seat frame 120 and the back frame 122, and arranged, at least partially, underneath the seat bottom 124. The body panel 130 is partially arranged on a top side of the seat frame 120 and defines an opening 132, shown in FIG. 7, of the under-seat cavity 126, and hence engine compartment 110, through which a maintenance person can access the engine compartment 110 to access one or more components of the vehicle 100 arranged inside the engine compartment 110. Further, the body panel 130 includes a tool kit chamber 136, shown in FIGS. 3 and 7, that is arranged beneath the seat bottom 124 to store and retain one or more maintenance tools, for example, a wrench. As shown, the tool kit chamber 136 is arranged forwardly of the opening 132 and is arranged proximate to a front end of the seat frame 120. A portion of the body panel 130 is attached to the back frame 122 and may be disposed between the back frame 122 and the back rest 128. The body panel 130 is made of plastic.

Furthermore, referring to FIGS. 2 to 6, and FIG. 8, the seat assembly 112 includes a maintenance lid 140 removably engaged to the body panel 130 and arranged contacting the body panel 130. As shown, the maintenance lid 140 includes a lid structure 142 extending underneath the seat bottom 124 and contacting a portion of the body panel 130 supported on the seat frame 120, covering the tool kit chamber 136 and the opening 132. The lid structure 142 includes a first end 144 arranged proximate to the front end of the seat frame 120 and a second end 146 disposed proximate to the rear end of the seat frame 120 i.e., proximate to the back frame 122. As shown, the lid structure 142 includes a storage box 150 and a lid potion 152 extending from the first end 144 to the storage box 150 and arranged underneath the seat bottom 124 and engaged to the body panel 130.

The storage box 150 extends towards the second end 146 from the lid portion 152, and is arranged covering the opening 132 of the body panel 130, while the lid portion 152 is arranged covering the tool chamber 136. As shown, the storage box 150 includes a receptacle 156 that extends inside the under-seat cavity 126 i.e., hollow interior of the seat frame 120, shown in FIG. 3, and defines a storge chamber 158 i.e., chamber 158, to store one or more articles inside the seat assembly 112. An upper end 160 of the receptacle 156 defines an access/upper opening 162 of the storage chamber 158 that is to be covered by the seat bottom 124. Further, to facilitate the engagement of the lid structure 142 with the body panel 130, the storage box 150 includes a skirt portion 164 or a lip portion 164 extending in a horizontal direction from the upper end 160 of the receptacle 156 and outwardly of the upper opening 162. The skirt portion 164 extends, at least partially, along the upper end 160 of the receptacle 156, and engages with an inner edge portion 166 of the body panel 130. Accordingly, the skirt portion 164 retains the storage box 150 supported on the body panel 130, and hence the seat frame 120 with the receptacle 156 extending downwardly and inside the hollow interior i.e., under-seat cavity 126 of the seat frame 120. The lid structure is made of plastic and hence the skirt portion forms a plastic to plastic contact with the body panel 130, forming a seal therebetween.

Further, a part of the skirt portion 164 is arranged between the receptacle 156 and the lid portion 152 separating the lid portion 152 from the receptacle 156. As shown, the lid portion 152 extends from the storage box 150 to the first end 144 of the lid structure 142, and covers the tool kit chamber 136 from top. In some embodiments, the lid portion 152 includes a gate 168 adapted to be moved between an open position and a close position. In the close position, the gate 168 is arranged covering the tool kit chamber 136, while in the open position, the gate 168 is arranged away from the tool kit chamber 136, providing an access of an inside of the tool kit chamber 136 from top. In some embodiments, the gate 168 may be omitted. In some embodiments, the lid portion 152 is integrally formed with the storage box 150 i.e., the skirt portion 164. Also, the lid portion 152 includes an edge portion 170 that contacts the inner edge portion 166 of the body panel 130, engaging the lid portion 152 with the body panel 130. As the body panel 130 and the lid portion 152 are made of plastic, a plastic to plastic contact occurs, providing a seal joint therebetween. Moreover, the maintenance lid 140 may include a cup structure 172 extending forwardly of the first end 144 of the lid structure 142 and arranged underneath the seat frame 120, best shown in FIG. 6, and defines a pocket 176 to receive a hook 178 of the seat bottom 124 that engages with the seat frame 120. The cup structure 172 is integrally formed with the lid portion 152.

Furthermore, the maintenance lid 140 includes an engagement structure 180 arranged/disposed underneath the back rest 128 and engaged to a vertical portion of the body panel 130. The engagement structure 180 extends vertically upwardly from the lid structure 142. A plurality of reinforcement ribs 182 is arranged at an intersection of the lid structure 142 and the engagement structure and connected to both the engagement structure 180 and the lid structure 142. Further, the maintenance lid 140 includes a lift structure 184, for example, a handle 186, arranged proximate to an upper end of the engagement structure 180 to enable a holding of the maintenance lid 140 to facilitate a user to disengage the maintenance lid 140 from the body panel 130 and remove the maintenance lid 140. To secure the maintenance lid with the body panel, the By removing the maintenance lid 140, an access of the engine compartment 110 through the under-seat cavity 126 is provided to a technician to carry out maintenance work. Also, as the plastic to plastic contact is maintained between the body panel 130 and the maintenance lid 140, and the tool kit chamber 136 is covered by the lid portion 152, a transmission of the noise/sound and heat from the engine compartment 110 to an ambient environment is reduced. Also, the sealing contact between the maintenance lid 140 and the body panel 130 reduces or prevents an ingress of water inside the engine compartment 110 from the seat assembly 112.

Figure 9:
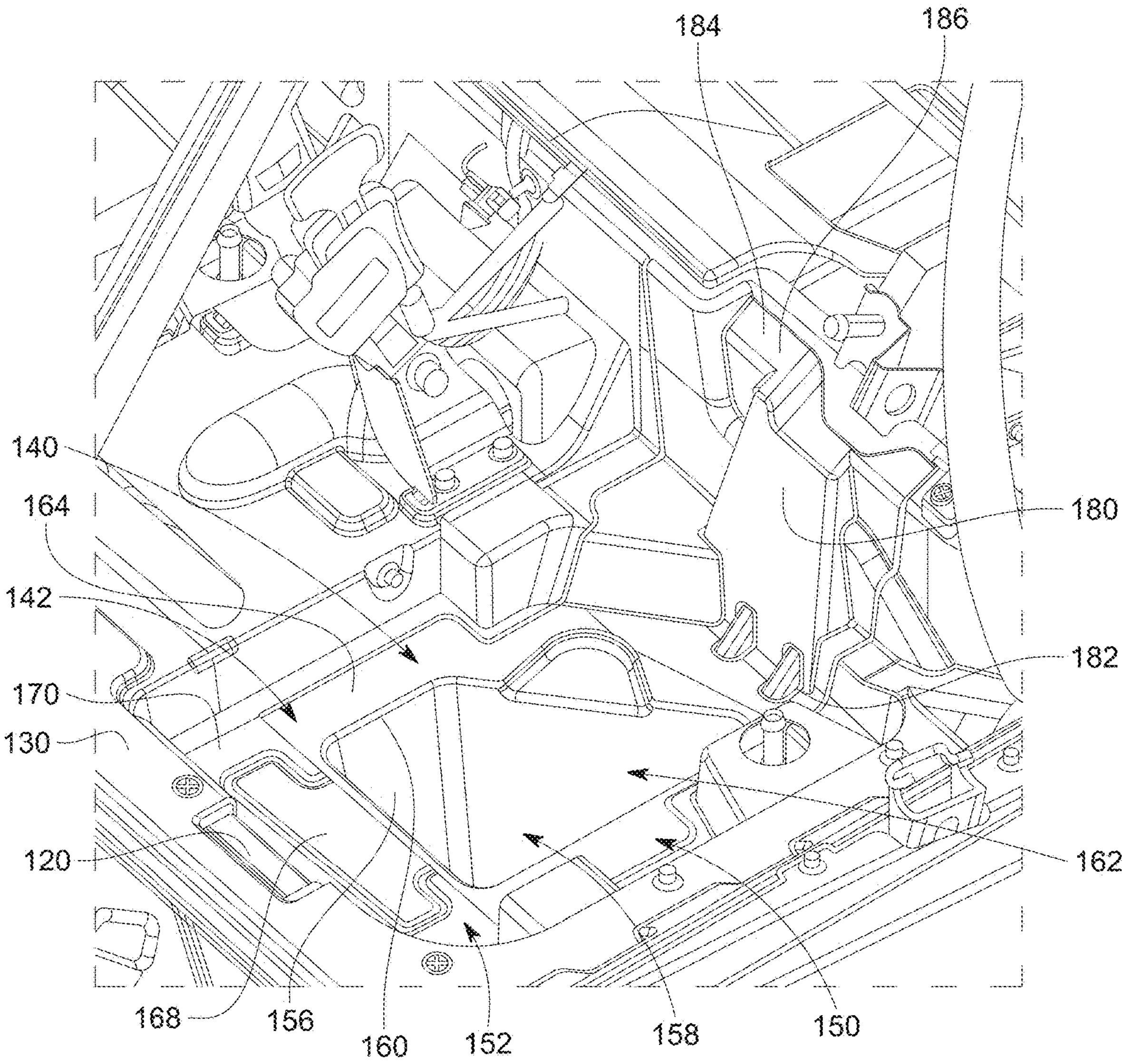
FIGS. 9-11 illustrates various steps involved in disengaging and removing the maintenance lid from the body panel, in accordance with one embodiment of the present disclosure.
Figure 10:
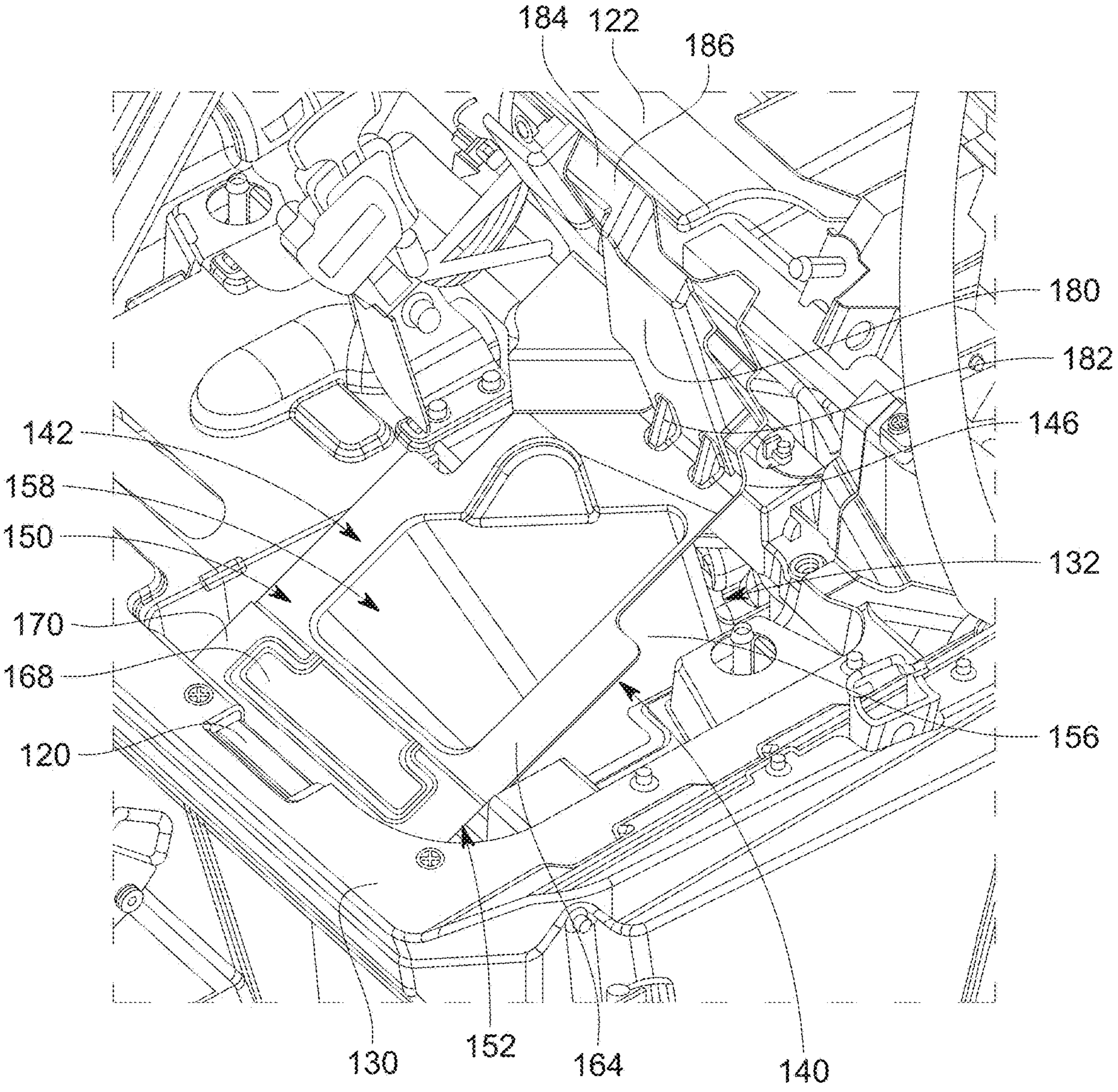
Figure 11:
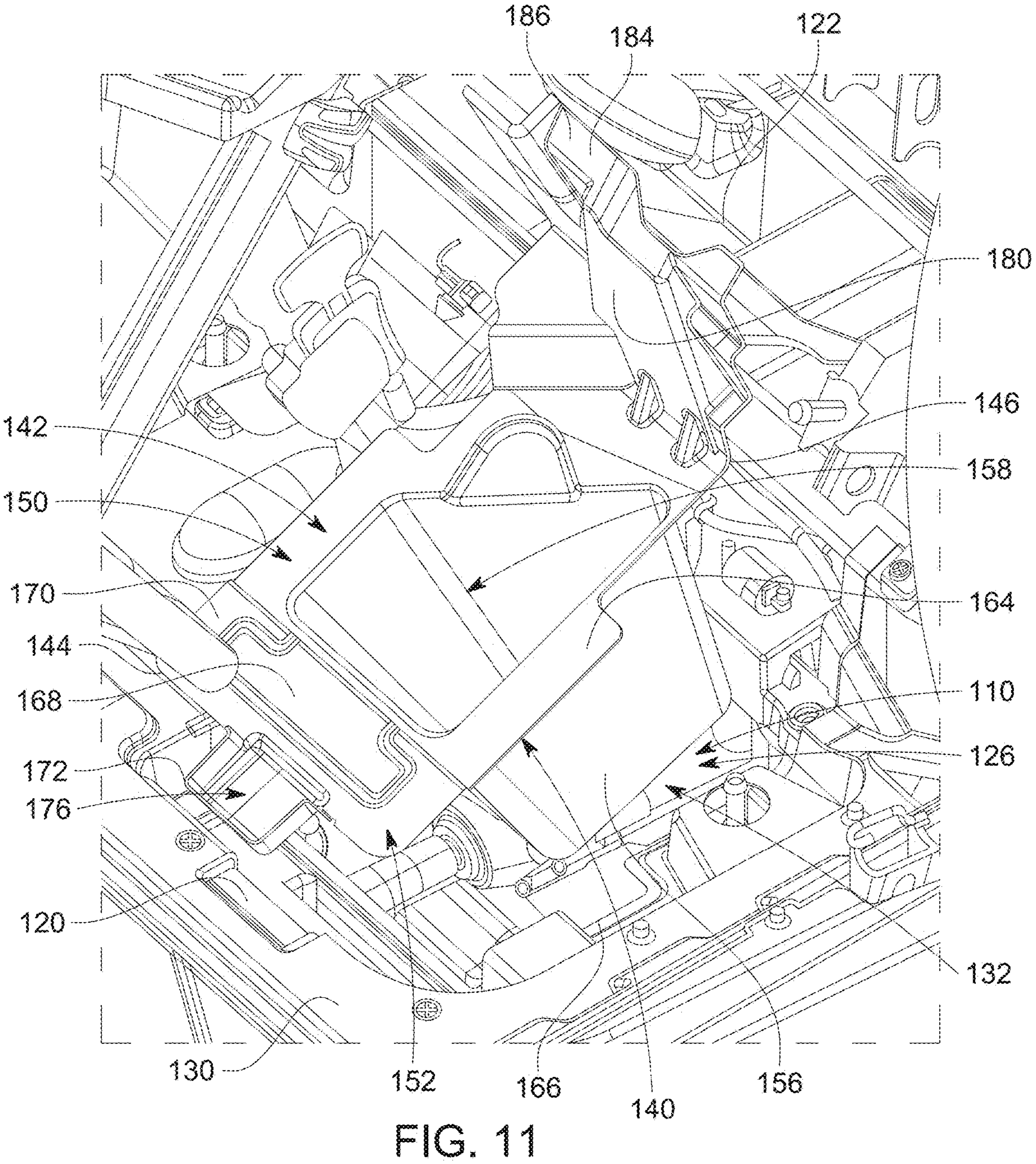

FIGS. 9 to 11 shows various steps in disengaging and removing the maintenance lid 140 from the body panel 130 to provide the access of the engine compartment 110. FIG. 9 shows the maintenance lid 140 arranged covering the under-seat cavity 126. In this position, to remove the maintenance lid 140 from the seat frame 120 i.e., body panel 130, a user holds the lift structure 184 and pulls the engagement structure 180 upwardly and forwardly, thereby disengaging the maintenance lid 140 from the body panel 130. The tilted position of the maintenance lid 140 is shown in FIG. 10. It may be noted that as the maintenance lid 140 is pulled upwardly and forwardly, the engagement structure 180 displaces forwardly towards the front edge of the seat frame 120, causing the removal of grommets 190, shown in FIG. 4, of the maintenance lid 140 from the holes of the body panel 130, and movement of the cup structure 172 rearwardly towards the rear edge of the seat frame 120. Accordingly, the maintenance lid 140 is rotated/tilted to disengage the maintenance lid 140 from the body panel 130. Upon tilting the maintenance lid 140 in such a manner, the user lifts the maintenance lid 140 vertically upwardly, as shown in FIG. 11, and moves the maintenance lid 140 away from the body panel 130 and the seat frame 120, enabling the access of the tool kit chamber 136 and the engine compartment 110 through the opening 132 of the body panel 130. Accordingly, the maintenance lid 140 can be removed easily without any tool.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A maintenance lid for a vehicle and adapted to be used with a vehicle seat assembly, the vehicle seat assembly includes a seat frame, a seat bottom configured to support a passenger, and a body panel attached to the seat frame and arranged, at least partially, underneath the seat bottom and defines an opening and a tool kit chamber arranged beneath the seat bottom, the maintenance lid comprising:
- a lid structure having a first end and a second end, wherein the lid structure is configured to be arranged underneath the seat bottom and engaged to the body panel, the lid structure comprises
  - a storage box including
    - a receptacle with an upper end of the receptacle defining an upper opening, wherein the receptacle is adapted to extend inside a hollow interior of the seat frame through the opening, and
    - a skirt portion extending, partially, along, the upper end of the receptacle and outwardly of the receptacle, wherein the skirt portion is adapted to engage with the body panel, and
  - a lid portion integral to the storage box and extending from the first end to the storage box, wherein the lid portion is configured to cover the tool kit chamber and adapted to engage with the body panel.

2. The maintenance lid of claim 1 further comprises an engagement structure extending vertically from the second end of the lid structure and adapted to engage with the body panel arranged rearwardly of a back rest of the vehicle seat assembly.

3. The maintenance lid of claim 2 further including a lift structure arranged proximate to a free end of the engagement structure to enable a user to lift the maintenance lid relative to the body panel to enable a disengagement of the maintenance lid from the body panel.

4. The maintenance lid of claim 1, wherein the lid portion includes a gate adapted to pivot between an open position and a closed position, wherein in the open position, the gate enables an access of the tool kit chamber.

5. The maintenance lid of claim 1 further including a cup structure attached to the lid portion and extending in a longitudinal direction from the first end in a direction away from the storage box.

6. The maintenance lid of claim 5, wherein the cup structure is adapted be arranged beneath the seat frame and provides a pocket to receive a hook of the seat bottom.

7. The maintenance lid of claim 5, wherein the cup structure is integrally formed with the lid structure.

8. A vehicle seat assembly, comprising:
- a seat frame;
- a seat bottom supported on the seat frame and configured to support a passenger;
- a body panel attached to the seat frame and arranged, at least partially, underneath the seat bottom and defines an opening and a tool kit chamber arranged beneath the seat bottom; and
- a maintenance lid removably engaged to the body panel and comprises
  - a lid structure having a first end and a second end, wherein the lid structure extends underneath the seat bottom and is engaged to the body panel, the lid structure includes
    - a storage box including
      - a receptacle with an upper end of the receptacle defining an upper opening, wherein the receptacle is adapted to extend inside a hollow interior of the seat frame through the opening, and
      - a skirt portion extending, partially, along, the upper end of the receptacle and outwardly of the receptacle, wherein the skirt portion is arranged engaged with the body panel, and
    - a lid portion integral to the storage box and extending from the first end to the storage box, covering the tool kit chamber and engaged with the body panel.

9. The vehicle seat assembly of claim 8, wherein the maintenance lid includes an engagement structure extending vertically from the second end of the lid structure and engaged with the body panel arranged rearwardly of a back rest of the vehicle seat assembly.

10. The vehicle seat assembly of claim 9 further including a lift structure arranged proximate to a free end of the engagement structure to enable a user to lift the maintenance lid relative to the body panel to enable a disengagement of the maintenance lid from the body panel.

11. The vehicle seat assembly of claim 8 further including a cup structure attached to the lid portion and extending in a longitudinal direction from the first end in a direction away from the storage box.

12. The vehicle seat assembly of claim 11, wherein the cup structure is arranged beneath the seat frame and provides a pocket to receive a hook of the seat bottom.

13. The vehicle seat assembly of claim 11, wherein the cup structure is integrally formed with the lid structure.

14. The vehicle seat assembly of claim 8, wherein the lid portion includes a gate adapted to pivot between an open position and a closed position, wherein in the open position, the gate enables an access of the tool kit chamber.

15. A vehicle, comprising:
- a body to support one or components of the vehicle and defining an engine compartment;
- a seat frame arranged supported on the body, wherein the engine compartment is arranged beneath the seat frame;
- a seat bottom supported on the seat frame and configured to support a passenger;
- a body panel attached to the seat frame and arranged, at least partially, underneath the seat bottom and defines an opening of the engine compartment and a tool kit chamber arranged beneath the seat bottom; and
- a maintenance lid removably engaged to the body panel and comprises
  - a lid structure having a first end and a second end, wherein the lid structure extends underneath the seat bottom and is engaged to the body panel, the lid structure includes
    - a storage box including
      - a receptacle with an upper end of the receptacle defining an upper opening, wherein the receptacle is adapted to extend inside a hollow interior of the seat frame through the opening, and
      - a skirt portion extending, partially, along, the upper end of the receptacle and outwardly of the receptacle, wherein the skirt portion is arranged engaged with the body panel, and
    - a lid portion integral to the storage box and extending from the first end to the storage box, covering the tool kit chamber and engaged with the body panel.

16. The vehicle of claim 15, wherein the maintenance lid includes an engagement structure extending vertically from the second end of the lid structure and engaged with the body panel and rearwardly of a back rest of the vehicle.

17. The vehicle of claim 16 further including a lift structure arranged proximate to a free end of the engagement structure to enable a user to lift the maintenance lid relative to the body panel to enable a disengagement of the maintenance lid from the body panel.

18. The vehicle of claim 15 further including a cup structure attached to the lid portion and extending in a longitudinal direction from the first end in a direction away from the storage box.

19. The vehicle of claim 18, wherein the cup structure is arranged beneath the seat frame and provides a pocket to receive a hook of the seat bottom.

20. The vehicle of claim 15, wherein the lid portion includes a gate adapted to pivot between an open position and a closed position, wherein in the open position, the gate enables an access of the tool kit chamber.

* * * * *